United States Patent [19]
Farrant et al.

[11] 3,937,608
[45] Feb. 10, 1976

[54] MEANS AND TECHNIQUES USEFUL IN PREPARING FRENCH FRIES

[75] Inventors: David A. Farrant; Robert Sirkin, both of Northridge, Calif.

[73] Assignee: The Scionics Corporation, Culver City, Calif.

[22] Filed: Apr. 29, 1969

[21] Appl. No.: 820,091

[52] U.S. Cl. ............................................. 425/159
[51] Int. Cl.² ....................................... A21C 11/16
[58] Field of Search ......... 107/14, 14.2, 14.3, 14.6, 107/14.7; 100/50, 51, 52; 18/1 E, 12 A, 12 P, 12 TS, 16 C, 30 QD, 30 QM; 425/155, 159, 145, 149, 311, 313; 139/1 E

[56] References Cited
UNITED STATES PATENTS

| | | | |
|---|---|---|---|
| 2,452,380 | 10/1948 | Kronoff et al. | 139/1 E |
| 3,010,149 | 11/1961 | Makay | 18/12 |
| 3,101,761 | 8/1963 | Buehler et al. | 107/14 |
| 3,344,752 | 10/1967 | Ilines | 107/14 |
| 3,371,386 | 3/1968 | Ludwig | 425/159 |
| 3,396,431 | 8/1968 | Kovach et al. | 425/159 |
| 3,428,001 | 2/1969 | Zwart | 107/14 |
| 3,459,141 | 1/1969 | Keil | 425/311 |
| 3,468,354 | 9/1969 | Reachert | 425/313 |
| 3,470,830 | 10/1969 | Carter et al. | 107/14 |
| 3,499,396 | 3/1970 | Kaufmann et al. | 425/155 |
| 3,503,342 | 1/1971 | Ilines | 107/14 |
| 3,611,951 | 10/1971 | Sloan | 425/313 |

OTHER PUBLICATIONS
1,269,972, German Publication to Willemsen, Pub. 7–1967, 107–14.2.

*Primary Examiner*—Louis K. Rimrodt
*Attorney, Agent, or Firm*—Lyon & Lyon

[57] ABSTRACT

Apparatus for extruding and cutting potato dough in the process of making French Fries uses a motor-driven ram which is allowed to recede after an extrusion operation to allow compressive forces in the dough container to be relieved after which a brake may be applied. The length of extrusion is established by time or by interrupting a beam to a photocell. In a modification, extrusion begins only after a predetermined pressure is first achieved in the dough container. The dough container is of special construction allowing both mixing and subsequent dispensing.

28 Claims, 30 Drawing Figures

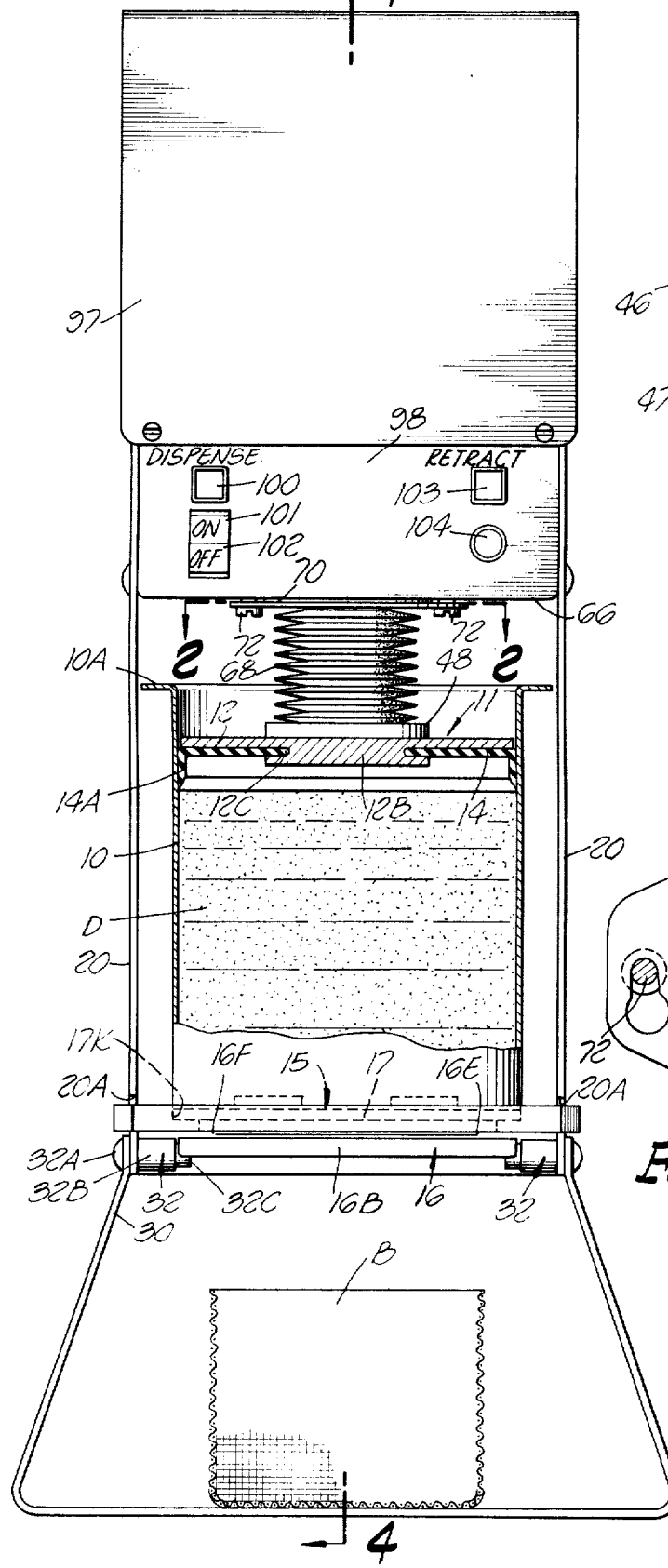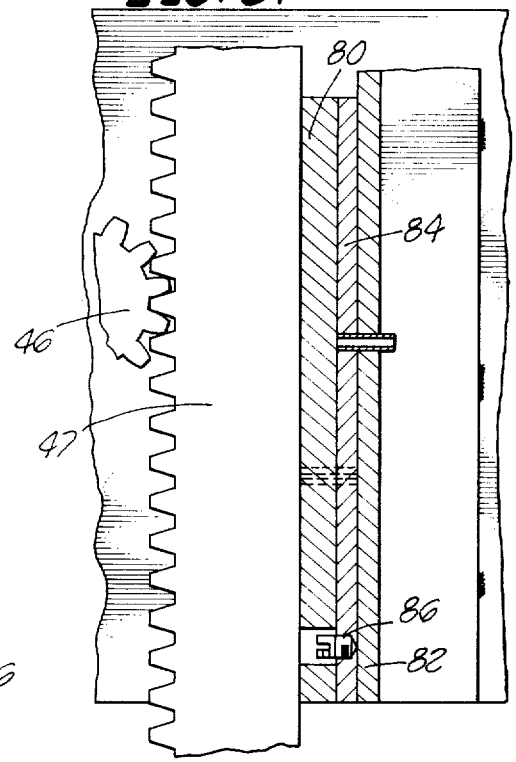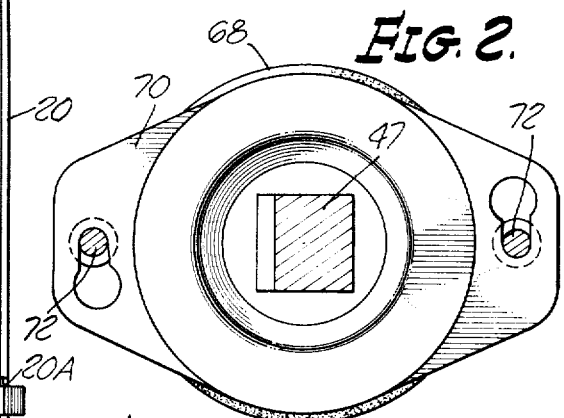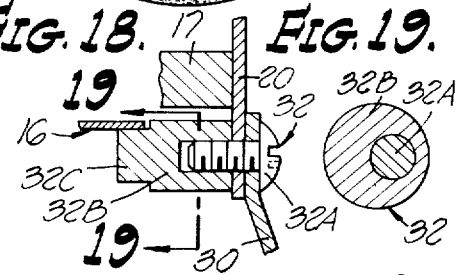

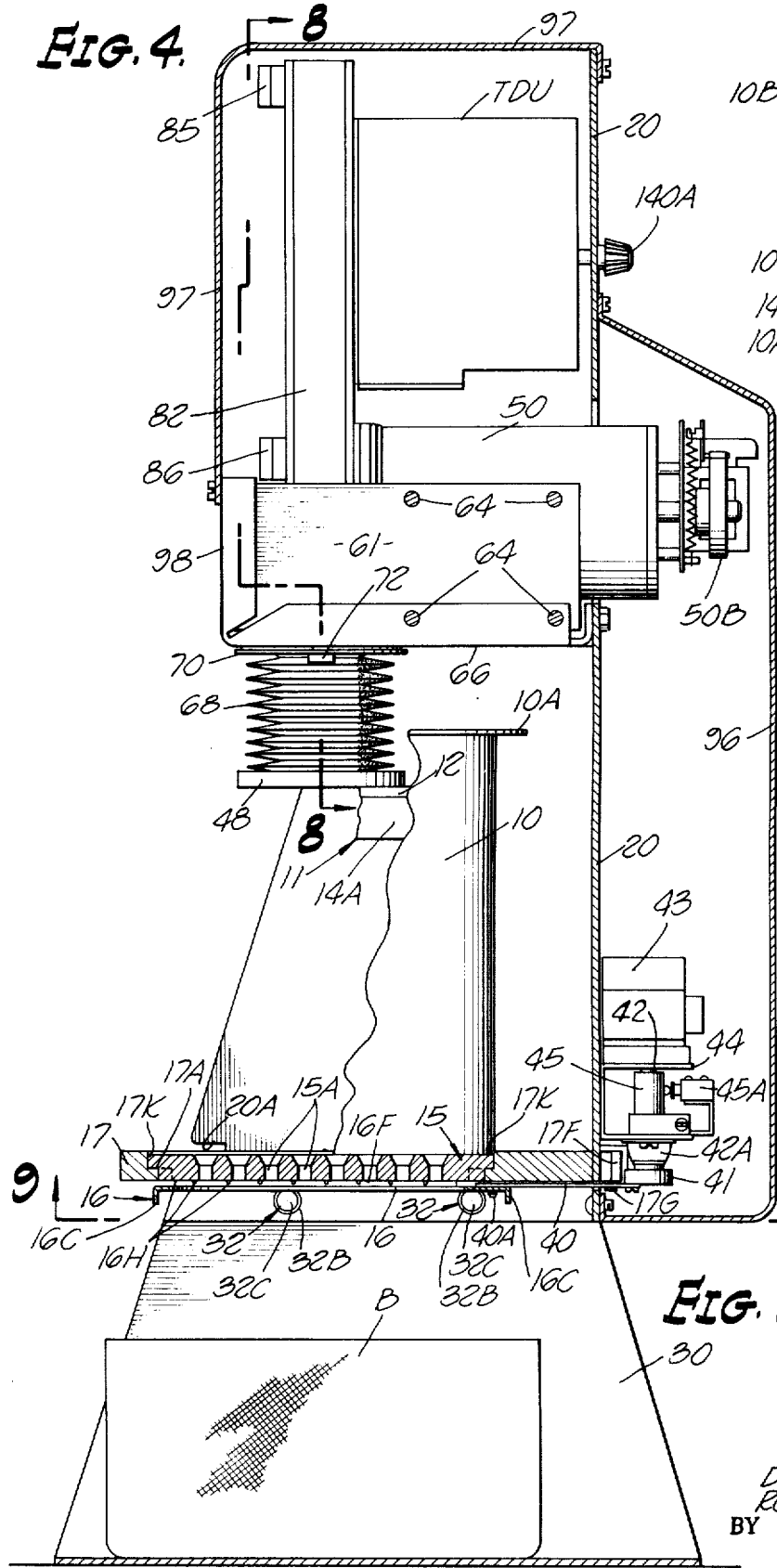
FIG. 4.
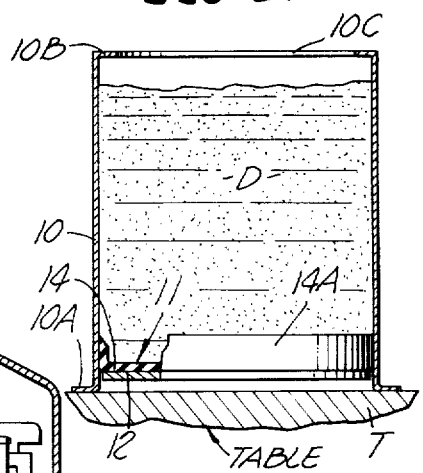
FIG. 5.
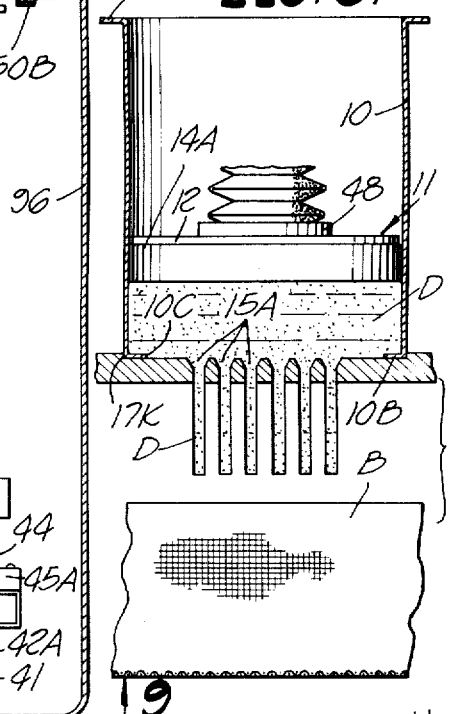
FIG. 6.
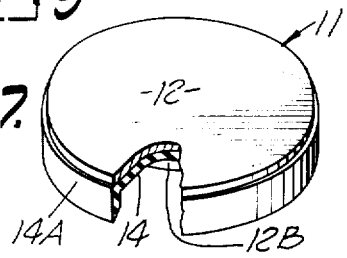
FIG. 7.
INVENTORS.
DAVID A. FARRANT
ROBERT SIRKIN
BY
ATTORNEYS INVENTORS.
DAVID A. FARRANT
ROBERT SIRKIN
BY
Lyon & Lyon
ATTORNEYS

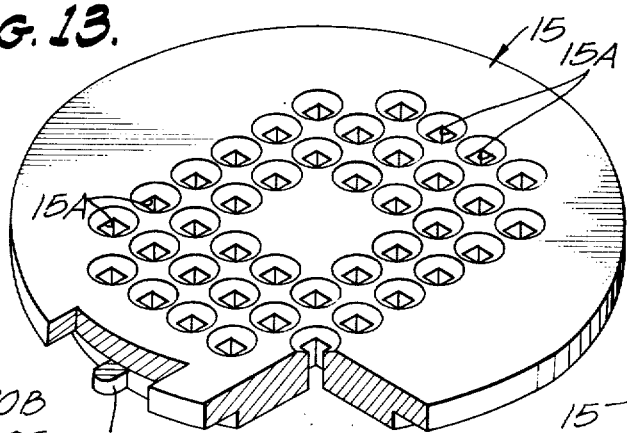
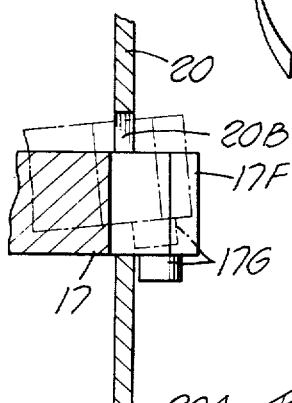
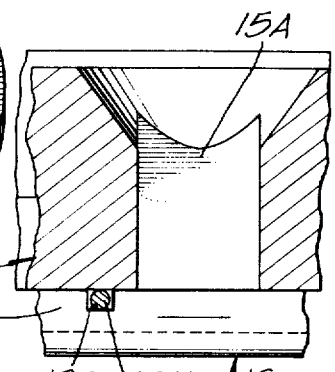
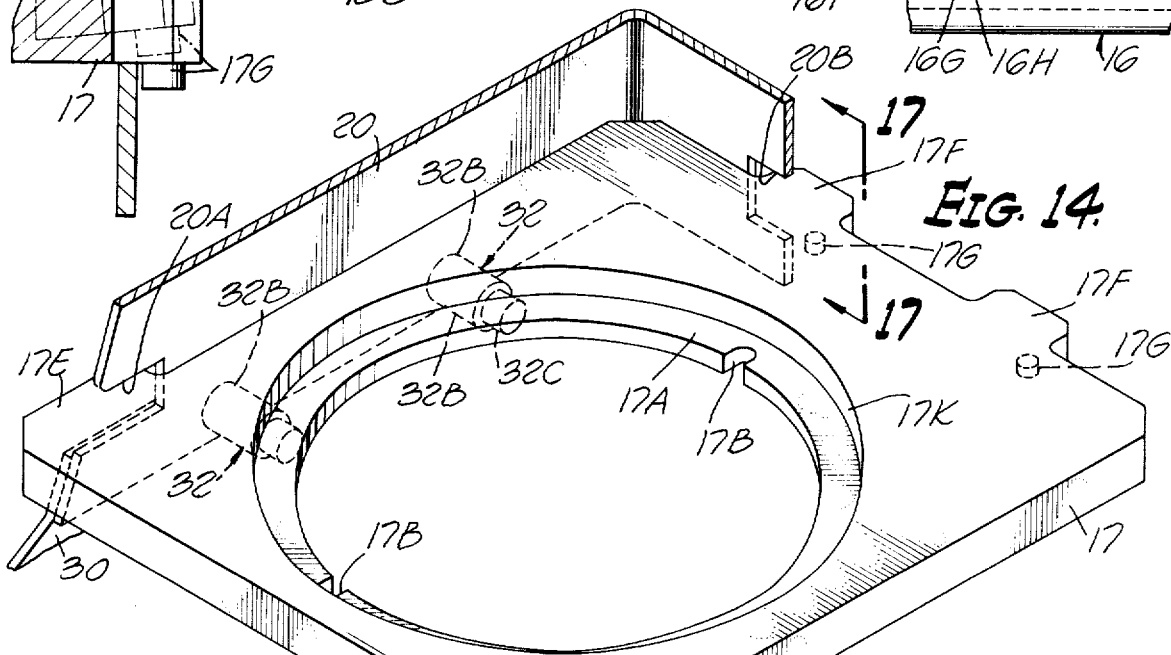

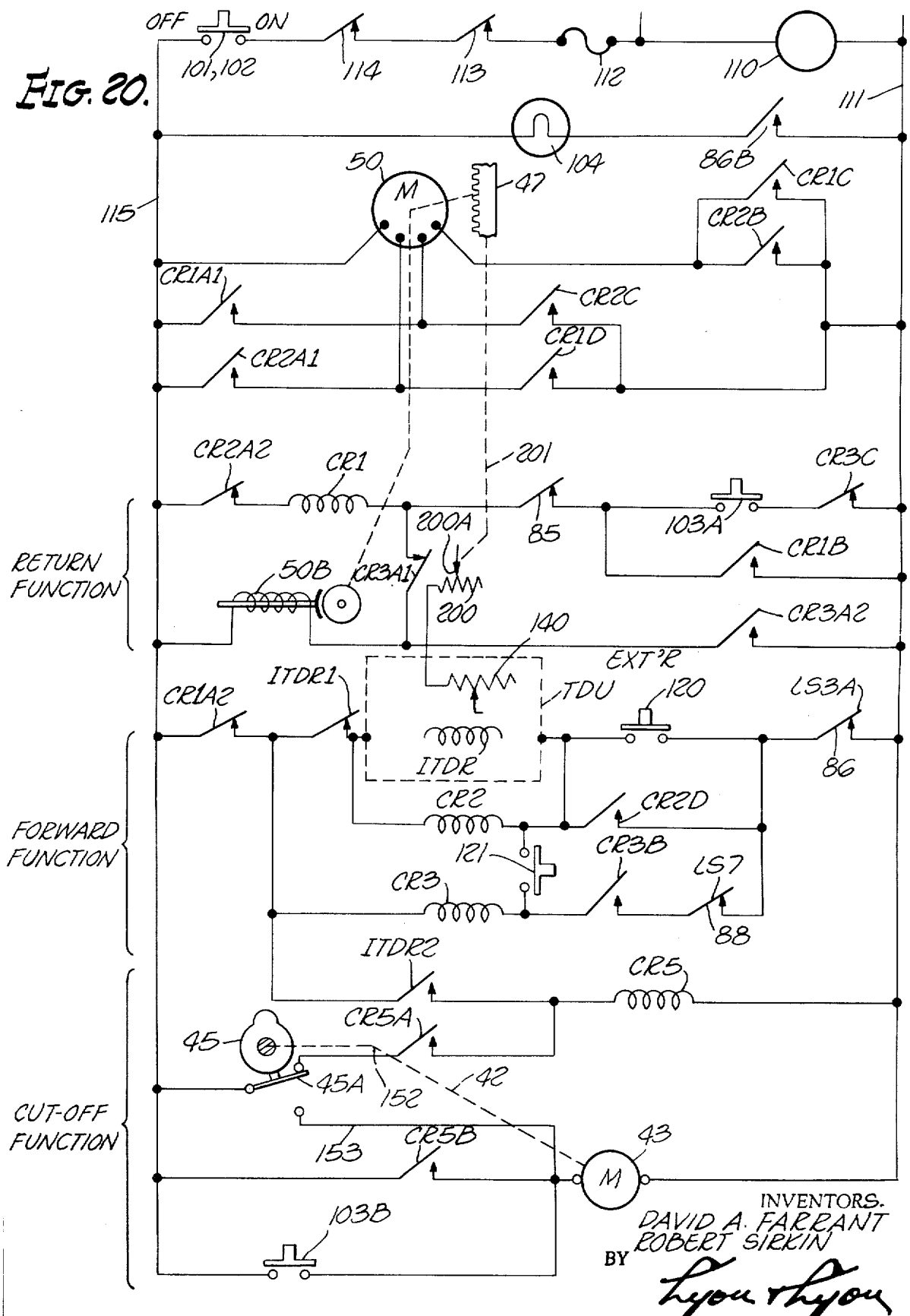

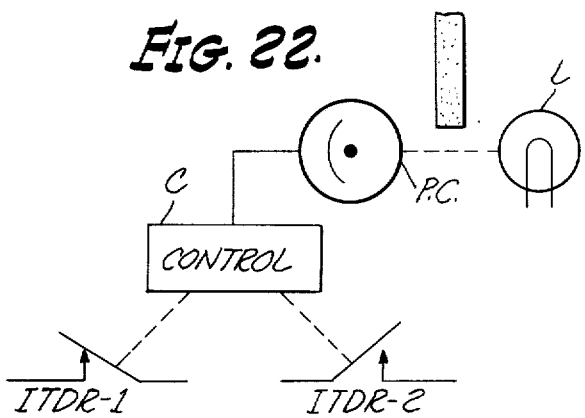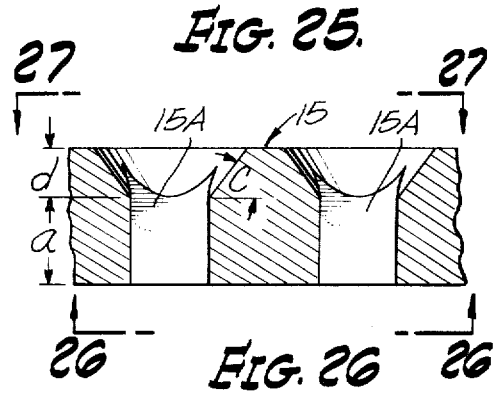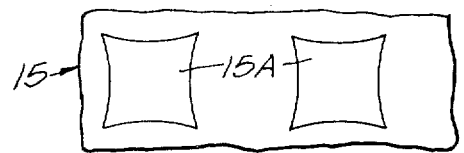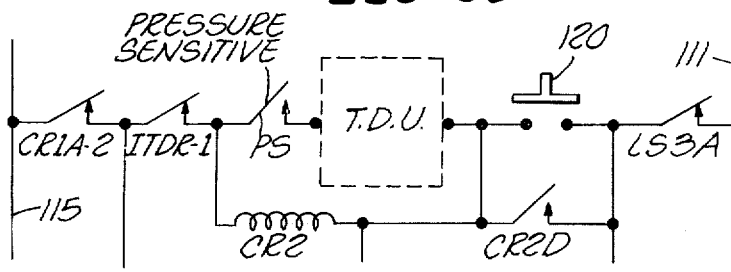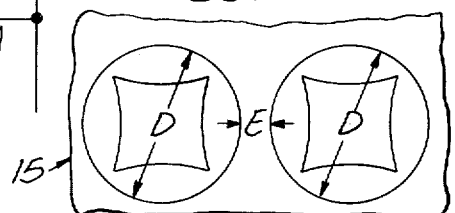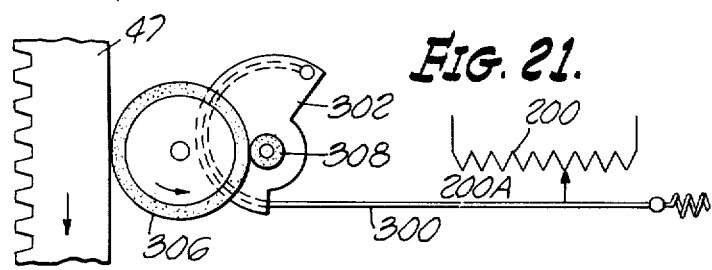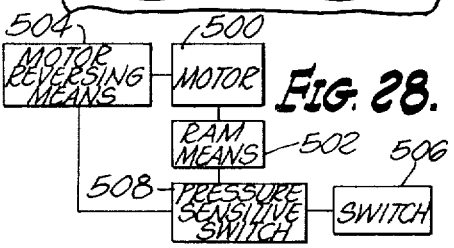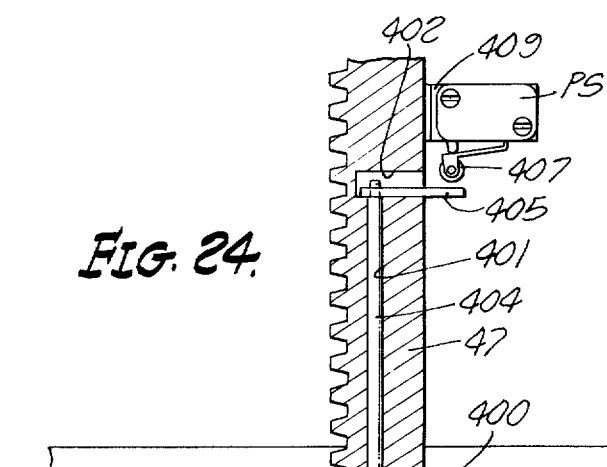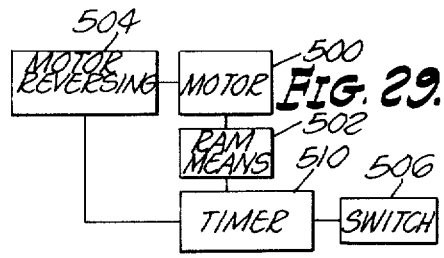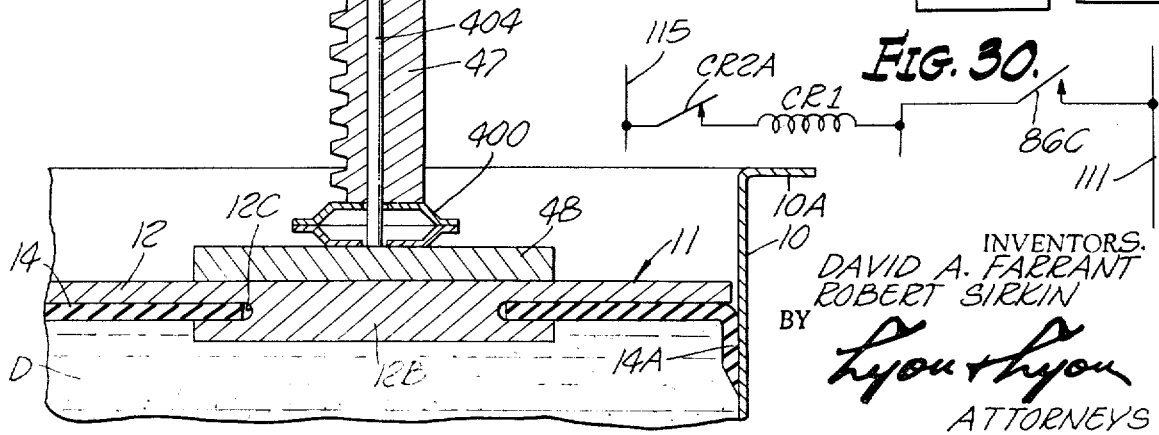

MEANS AND TECHNIQUES USEFUL IN PREPARING FRENCH FRIES

The present invention relates to improved means and techniques which are particularly useful in the preparation of French fried potatoes. An object of the present invention is to provide improved means and techniques whereby a dehydrated potato mix may be mixed with water to form a dough in a container from which subsequently such dough is extruded or dispensed ready for conventional deep-fat frying.

Another object of the present invention is to provide apparatus of this character which is relatively simple, easy to clean and maintain, reliable in operation, and capable of producing extruded dough in square cross-ssection and of predetermined lengths immediately ready for frying in conventional deep-fat frying equipment.

Another object of the present invention is to provide apparatus of this character which is admirably suited for use in restaurants and commercial institutions and in government installations such as those in military stations and ships.

Another object of the present invention is to provide apparatus of this character which is entirely mechanized in that it requires only the mixing of dough into a container and the dispensing the same from the same container upon operation of a switch.

Another object of the present invention is to provide apparatus of this character in which means are provided to minimize or obviate entirely problems which otherwise are present due to a tendency of the dough to extrude or "bleed" through an extruding die after a dispensing operation during which the dough is under some pressure.

Another object of the present invention is to provide apparatus of this character which produces extruded dough of consistent appearance even though there may be some time interval between extruding operations.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIG. 1 is a view in front elevation of apparatus embodying features of the present invention with the dough container being shown in section and with a conventional wire basket positioned to receive the extruded dough.

FIG. 2 is a view taken as indicated by the lines 2—2 in FIG. 1.

FIG. 3 is a view taken as indicated by the lines 3—3 in FIG. 10.

FIG. 4 is a sectional view taken substantially as indicated by the lines 4—4 in FIG. 1.

FIG. 5 illustrates the dispensing container in an inverted position during which the potato flour is mixed with water to form a dough preparatory to placement in the machine in FIG. 1.

FIG. 6 shows the container in up-right position and also illustrates the manner in which the dough is extruded therefrom into a conventional wire French fry basket during operation of the machine shown in FIG. 1.

FIG. 7 is a perspective view, partly in section, of the piston-like member illustrated also in FIGS. 5 and 6, and also in FIG. 1.

FIG. 13 is a perspecitve view, partly in section, of an apertured extruding die-plate used in the machine of FIG. 1.

FIG. 14 is a perspective view of the holder for the dieplate of FIG. 13 in relationship to a portion of its supporting structure.

FIG. 15 is a perspective view illustrating the reciprocable cutting device and a portion of its mounting structure.

FIG. 16 is a sectional view taken as indicated by the lines 16—16 in FIG. 9.

FIG. 17 is a view taken as indicated by the lines 17—17 in FIG. 14 and also illustrates the manner in which the holder for the dieplate may be assembled to and disassembled from a portion of its supporting structures.

FIG. 18 is a view taken as indicated by the lines 18—18 in FIG. 9.

FIG. 19 is a view taken as indicated by the lines 19—19 in FIG. 18.

FIG. 20 illustrates the control circuit for the machine shown in FIG. 1.

FIG. 21 illustrates a modified form of the present invention.

FIG. 22 illustrates a modified form of the present invention using a photocell.

FIG. 23 illustrates another embodiment of the present invention using a pressure switch of the character illustrated in FIG. 24.

FIG. 24 illustrates a pressure switch for sensing the compressed state of the potato dough in the container.

FIG. 25 illustrates preferred shapes of the extrusion openings.

Figure 8:
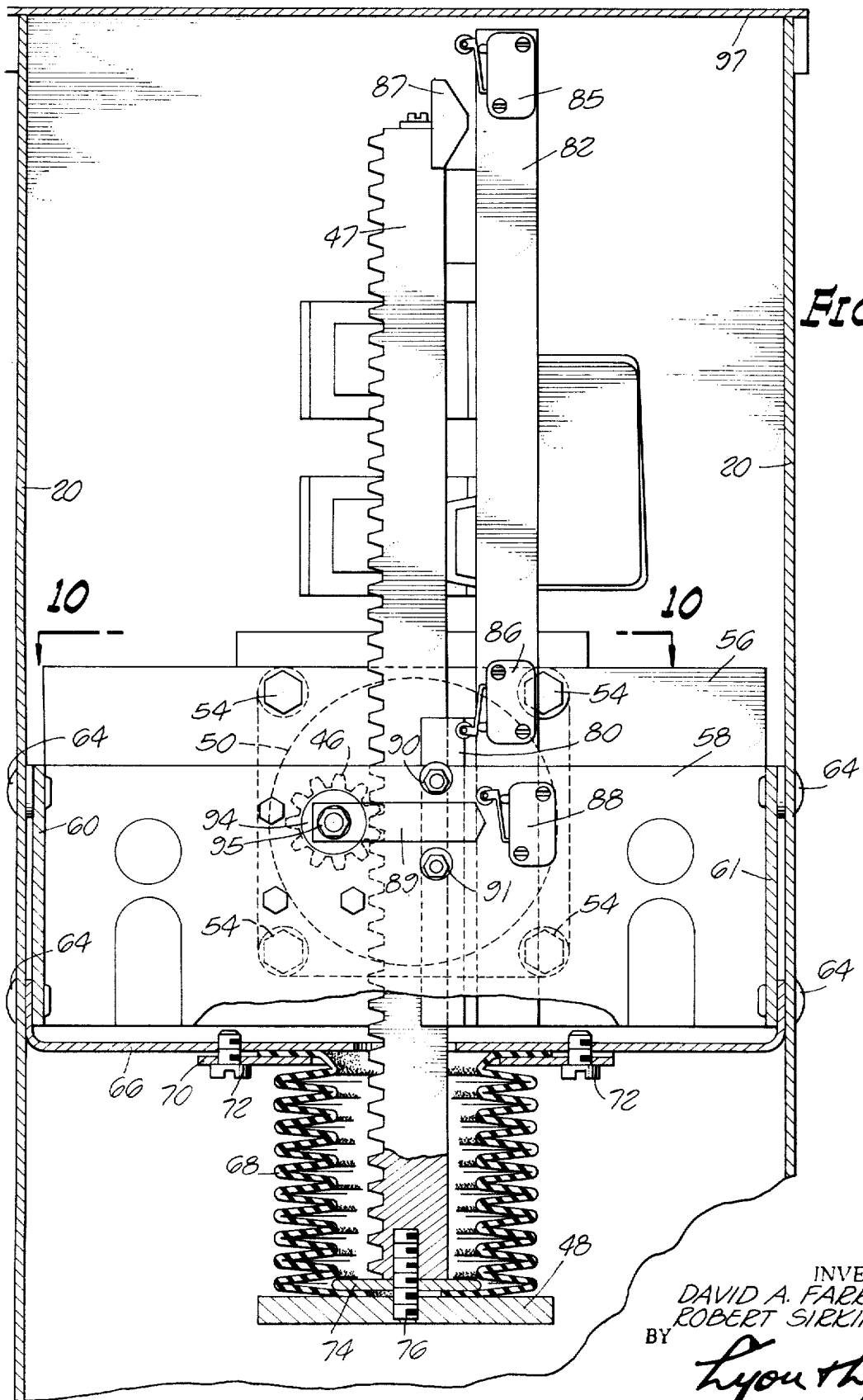
FIG. 8 is a sectional view taken substantially as indicated by the lines 8—8 in FIG. 4.

FIGS. 26 and 27 are views taken as indicated by the lines 26—26 and 27—27, respectively, in FIG. 25.

FIGS. 28 and 29 illustrate other modifications of the present invention.

FIG. 30 illustrates another modification.

It is contemplated that the potato dough which is subsequently extruded from the apparatus is initially in the form of a dry or dehydrated potato mix which requires the addition of water and stirring to form a dough suitable for extruding by the machine. Such mixing and stirring is accomplished in the same container 10 (FIG. 5) from which the dough is subsequently dispensed.

For this initial purpose the container 10 is conveniently placed on a work table T in inverted form. Such container 10 is cylindrical and at one end is formed with an outer cylindrical flange 10A, the other end being formed with an inwardly extending annular flange portion 10B which defines the circular opening 10C. Mounted within container 10 and in sealing relationship thereto is a two-piece or pressure plate structure 11.

Such structure 11 as seen in FIGS. 5, 7 and 1 includes a metal disc-like element 12 which has an outer diameter somewhat less than the internal diameter of the container 10 and which has an enlarged annular central portion 12B formed with an annular recess 12C. The other element 14 is of neoprene and is of generally ring shape with an outer integrally formed annular sealing flange portion 14A. The inner portion of the neoprene ring 14 fits into the annular groove portion 12C so that the neoprene ring 14 may be retained but yet may be conveniently assembled to and disassembled from the metal disc member 12 as occasion requires. It will be seen that adjacent faces of the ring 14 and disc 12 are in flat abutting engagement and that the flange portion 14A resiliently presses against the inner wall of the container 10 to provide a tight seal, yet allow movement of the assembly 11 within the container 10.

After the mixing procedure, illustrated in connection with FIG. 5, the container 10 in FIG. 5 is then inverted and placed in the machine shown in FIGS. 1 and subsequent figures for subsequent extrusion through the extrusion dieplate 15 having in this example a total number of forty extrusion holes 15A.

This extrusion dieplate 15 is stationarily mounted above a reciprocable cutting device 16 in the manner now described.

The dieplate 15 is releasably mounted within an apertured, generally rectangular, plate 17 with the dieplate 15 resting on the plate ledge 17A and with a pair of positioning lugs 15B on plate 15 within corresponding indexing apertured portions 17 in plate 17. Thus the dieplate 15 is maintained by gravity within plate 17 and thus may also be conveniently removed from plate 17 for cleaning, servicing and other purposes. Such removal may be accomplished jointly with the plate 17 because, as now described, the plate 17 is also removably mounted.

The plate 17, as seen in FIG. 14, is formed with a first pair of forwardly disposed projections or ears 17E and a second pair of rearwardly disposed ears or projections 17F adjacent to which is disposed a pair of small circular and downwardly extending projections 17G.

The plate 17 is removably retained in an outer stationary frame or housing member 20 of sheet metal with such plate projections or ears 17E, 17F being releasably fitted within notched portions 20A, 20B respectively in the housing member 20. When the plate 17 is positioned within the housing member 20 as illustrated in FIG. 14 the pair of downwardly extending cylindrical projections 17G on plate 17 prevents withdrawal of the plate 17 unless the plate 17 is tilted as illustrated in FIG. 17 to such an extent that the cylindrical projection 17G then clears through the opening 20B.

Figure 9:
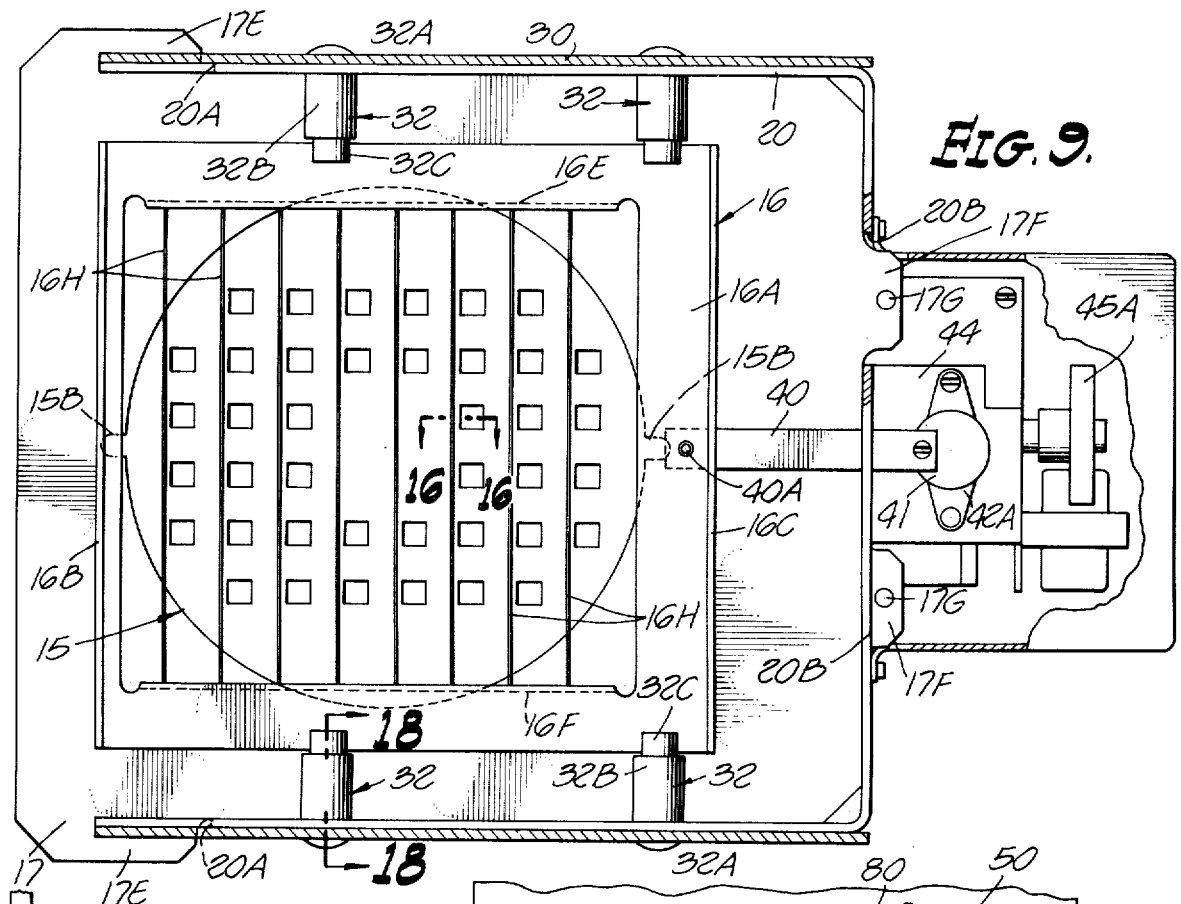
FIG. 9 is a view taken as indicated by the lines 9—9 in FIG. 4.

This frame member 20 of sheet metal material extends partially around the plate 17 as shown in FIG. 9 and has its lower edge secured to the upper ends of a generally U-shaped base member 30 using four special fastening devices 32 (FIGS. 1 and 9 and 18 and 19). This base memer 30 is also sheet metal stock is opened at each of its ends and supports a conventional wire French fry basket B within its confines.

This special fastening means 32 in addition to providing a connection between casing members 20 and 22 serves also as a means for providing an adjustable support upon which the dough cutting device 16 may be guided during its cutting movement.

For this latter purpose it will be seen that each of the fastening devices 32 includes a machine screw 32A (FIG. 18) threaded into a special nut member 32B. This nut member 32B is generally cylindrical and has an undercut 32C which is eccentrically located with respect to the axis of the fastening screw 32A. A portion of the cutting device 16 rests on this eccentric portion 32C and will be seen that the height of such cutting device 16 may thus be adjusted by turning the nut portion 32B and then securing such nut portion by fastening of the screw element 32A.

The cutting device 16 is perhaps best illustrated in FIG. 15 and it will be seen that involves generally an opened rectangular frame member 16A having downwardly extending end portions 16B and 16C and a pair of upwardly spaced edge portions 16E, 16F. Each of such edge portions 16E, 16F has a series of notched portions 16G for receiving a corresponding end of each of the cutter wires 16H. The arrangement is such that only the cutter wires 16H engage the underside of the dieplate 15 so as to obtain a good shearing action at the lower ends of each of the die openings 15A. This action is assured by the provision of the adjustment of the eccentric portions 32C upon which the cutter frame 16 rests and also by the fact that the upper edges of the wires 16H form the upper most part of the cutter device 16.

The cutting device 16 is moved by a link 40 having one of its ends pivotally secured to a motordriven eccentric 41 on motor shaft 42, the other end of the link 40 having a pin 40A which loosely fits into an apertured portion 16J of the cutting device 16 so that the pin 40A may be withdrawn from the apertured portion 16J in those cases where it is desired to remove, service, clean, or otherwise perform operations on the cutting device 16. This, of course, requires prior removal of the plate 17 in the manner described above.

The shaft 42 (FIG. 15) is driven by a motor 43 on a generally U-shaped bracket 44 secured to the frame of casing member 20. The shaft or motor 42 mounts a cam 45 for operating a switch 45A for a purpose described later and such shaft extends through the bearing 42A on bracket member 44 and, as indicated previously, mounts the eccentric 41 which drives the link 40 to produce a linear movement of the cutting frame 16 each time the motor 43 is energized.

A motor-driven pinion 46 meshes with a rack member 47, as illustrated in FIG. 8, to produce a corresponding downward movement of a pressure plate 48 attached to the lower end of the rack member 47, this pressure plate 48 being in contact with the pressure plate 12 of assembly 11 to produce an extrusion of the potato dough D through the extrusion openings 15A and extrusion plate 15. After a selected length of extrusion the cutting device 16 is moved back and forth to shear or cut the dough at the lower side of plate 15 whereupon the extruded dough falls into the conventional frying basket B. For this latter purpose the pinion 46 is on the output shaft of a speed reducing unit contained in the motor 50. The motor proper 50 is bolted by four bolts 54 to a vertically extending plate member 56 of a supporting frame which includes the other spaced and vertically extending plate 48 and two end plates 60 and 61 (FIG. 8). These end plates 60, 61, as seen in FIG. 8, are secured by fastening means 64 to the vertically extending casing member 20.

In this process of securing the frame 60 to the casing 20 a closure member 66, as seen in FIG. 8, has upturned end portions secured between the frame member 60, 61 and the casing 20. This closure member 66 with the expendable bellows 68 serves to isolate the operating mechanism from the pressure plate 48 so that dirt, dust, oil and the like may not be deposited or flow therefrom.

The bellows 68 has one of its ends clamped between the closure member 66 and a plate 70 which is secured to the closure member 66 by bolts 72. The lower end of the bellows 68 is clamped to the pressure plate 48 by clamping plate 74, a screw 76 secures the pressure plate 48 to the rack member 47 and also clamps the lower end of bellows 68 between the plates 74 and 48.

Figure 10:
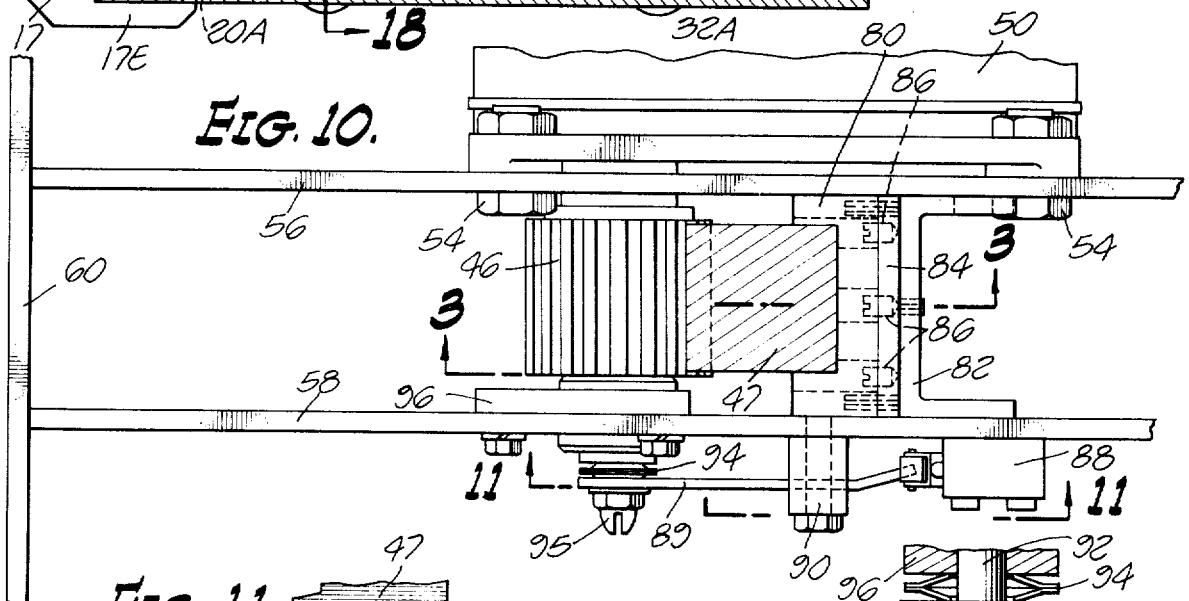
FIG. 10 is a view taken substantially as indicated by the lines 10—10 in FIG. 8.
Figure 12:
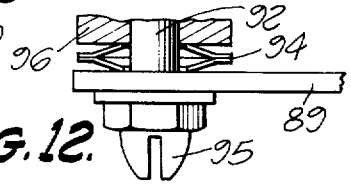
FIG. 12 illustrates on somewhat enlarged scale a part of the mechanism shown in FIG. 10.

The rack member 47 is slidably mounted in an adjustable guide 80, such guide structure 80 being adjustably mounted on the vertically extending channel member 82 using shims 84 and three adjustable screws 86 (FIGS. 3 and 10). The shims 84 allow the rack 47 to be positioned closer to the pinion 46 and the adjustment screws 86 provide some pivotal movement of the composite guide structure so that movement of the rack member 47 is substantially vertical. The channel member 82 is secured to the composite frame 56, 58, 60 and 61 and extends vertically substantially parallel with the rack member 47. Such channel member 82 mounts a pair of microswitches 85, 86 each being actuatable by the actuating member 87 on the upper end of the rack 47, the switch 85 being operated by the member 87 at the upper extreme movement of the rack 47 and likewise the other microswitch 86 is operated by the actuating member 87 at the extreme lowermost position of the rack member 47. The channel member 82 mounts a third microswitch 88 which may be operated by a link member 89 which is movable between the adjustable stop members 90 and 91 and which is frictionally secured with respect to the motor pinion shaft 92 (FIG. 12) using Belleville-type spring 94 interposed between the shaft bearing member 96 and the link 89. This spring 94 is maintained in a compressed condition by a nut 95 and lockwasher 96 on a threaded end of the motor shaft 92.

Figure 11:
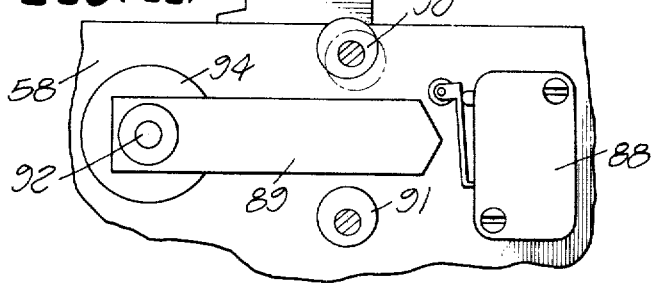
FIG. 11 is a view taken substantially as indicated by the lines 11—11 in FIG. 10.

The stop members 90, 91 are adjustable as indicated in FIG. 11 in that they comprise cam members on bolts which secure the cam members 90, 91 to the frame member 58. An access cover 96 (FIG. 4) is bolted to the casing member 20 to enclose the motors 43 and 50.

The upper portion as well as upper front portion is enclosed by the closure member 97 (FIG. 4) bolted to the casing member 20. A control panel 98, below cover member 97, is secured to the frame member 60, 61 and as seen in FIG. 1 mounts four push-buttons 100, 101, 102 and 103 and an indicating lamp 104. Operation of the push-buttons 100, 101, 102 and 103 performed respectively a "dispense" operation, and "on" operation, and "off" operation and a "retract" operation.

The following operation is accomplished with a container 10 full of potato dough D centrally mounted on the extrusion plate 15. Such central position is assured when the container 10 is within the circular indexing shoulder 17K of plate 17 as seen in FIGS. 6, and 4.

As seen in FIG. 20, the apparatus is powered from an A.C. voltage source 110 which has one of its terminals connected to the lead 111 and the other one of its terminals connected through a fuse 112, a bottom-limit switch 113, an upper limit switch 114, and a power off-on switch 101, 102 to the other lead 115. Normally a voltage thus appears across leads 111 and 115. To dispense or extrude dough through the die openings 15A the dispense switch push-button 100 in FIG. 1 is operated and this causes closure of two normally opened switches which are operated substantially simultaneously and are designated on the drawing as switches 120 and 121.

The apparatus incorporates various relays and for purposes of simplicity the operating coil of the relay is designated by the letters CR with a distinguishing number appended thereto and the associated switches which are operated when such coil is energized have the same letters and number but with a characteristic letter appended thereto. Thus, for example, there is a control relay having an actuating coil designated as CR1 and the switches which are actuated when the coil is energized are designated as CR1A, CR1B, CR1C and CR1D.

Thus when, as mentioned before, the extrude or dispense push-button is operated the switches 120 and 121 are closed. Such closure of switch 121 causes current to flow through the control relay CR3 in the following path, namely: from lead 115 through the normally closed relay switch CR1A2; relay coil CR3; switch 121; switch 120; and the normally closed switch 86 to the other lead 111. It is noted that switch 86 is as illustrated in FIG. 8 operated to its open position only when the rack 47 is moved to its lowermost position at which point the actuating member 87 causes the switch 86 to open. Thus, as long as the rack 47 is in an elevated position, the switch 86 remains closed.

When the foregoing described circuit is closed, relay switch CR3A1 opens; switch CR3A2 closes; relay switch CR3B closes; and relay switch CR3C opens. When the switch CR3A2 is thus closed, the brake coil 50B of motor 50 is energized thus allowing the shaft of motor 50 to turn. Normally the motor shaft is in a locked position maintained in such position because the brake coil 50B is de-energized. When switch CR3C is opened, an electrical interlock is provided in that the rack member can not be operated to a retract position. The opening of switch CR3A1, at this point, prevents the relay winding CR1 from being energized. As explained later, it will be seen that the switch CR3A1 provides a path for energizing the brake coil 50B when the retract button is operated to operate the associated retract switch 103A. When relay switch CR3B is closed, control relay winding CR2 as well as a time delay unit TDU is energized through a path which includes: lead 115; the normally closed relay switch CR1A2; normally closed time delay relay switch 1TDR1; relay coil CR2; switch 121; relay switch CR3B; the so-called "bounce-back" switch 88 (which corresponds to the switch 88 in FIG. 8); and the previously-mentioned switch 86, and the other lead 111.

When control relay CR2 is thus energized, five associated relay switches are operated, namely: relay switch CR2A1; CR2A2; CR2B; CR2C; and CR2D. The closing of switches CR2A1; CR2C; and CR2B causes the motor 50 to be energized in such direction as to move the rack or ram downwardly. At this time, the switch CR2A2 opens and provides an innerlock preventing energization of the control relay winding CR1. Closure of switch CR2D which is in parallel with the series connected switches 121, CR3B, and switch 88, provides a sealing circuit so that time delay unit TDU and CR2 remain energized even though either switch 121 or switch 88 opens. This assures continuous energization of the time delay unit TDU and coil CR2. The time delay unit TDU incorporates a relay coil 1TDR and associated resistance 140 which is connected in series with an external resistor 200 having an adjustable top for controlling the time delay of unit TDU. Such unit TDU may be of the type supplied by Hoagland Instrument Company Type H-620 in which the coil 1TDR energizes after a preset time interval (supply voltage applied) and deenergizes on removal of supply voltage.

The previous energization of the time delay unit TDU initiates a timing cycle the duration of which is established by adjustment of the resistance 140 and controlled by the knob 140A in FIG. 4. After the timer times itself out, i.e., after a time established by the adjusted magnitude of resistance 140, it causes the normally closed timer switch 1TDR1 to open and the other timer switch 1TDR2 to close. Such opening of switch 1TDR1 results in deenergization of the relay coil CR2 as well as the unit TDU to thereby allow the timer to reset itself. Closure of the switch 1TDR2 causes the relay coil CR5 to be energized. Thus, when relay coil CR2 is deenergized the ram motor 50 is deenergized. Energization of the control relay winding CR5, however, results in energization of the cutter motor 43. Relay switch 1TDR2 closes sufficiently long to allow the relay winding CR5 to become fully energized and cause closure of the associated relay switches CR5A and CR5B. Closure of switch CR5A causes the winding CR5 to remain energized through a circuit which includes the cam-operated switch 46 (FIG. 4). Closure of relay switch CR5B causes the motor 43 to be energized and cause the cam 45 to move whereupon lead 115 is no longer connected to lead 152 but to lead 153 and the motor 43 continues to operate until the cam 45 operates switch 46 to disconnect lead 115 from lead 153. This rotation of motor 43 results in one revolution of cam 41 (FIG. 4) so that the cutter device 16 then moves from one extreme position to the other extreme position then back again to its original rest position. In other words, the arrangement may be such that the cutter device is moved to and fro each time the motor 43 is energized. It will be seen that in order for the cutter motor 43 to be again operated, it is necessary that the switch 1TDR2 be again operated.

The length of the potato dough extrusion is dependent upon the adjusted value of the resistance 140 since it will be clear that the longer time delay established by adjustment of resistance 140 the longer the extrusion.

It will be seen that after the timer times itself out, unit TDU and coil CR2 are deenergized and consequently the motor 50 is deenergized but coil CR3 remains energized and hence its associated switch CR3A2 remains closed thereby continuing to maintain the brake coil 50B energized and hence the shaft of motor 50 and the ram connected thereto is free to move until the "bounce-back" switch 88 opens. When switch 88 opens, coil CR3 is deenergized, switch CR3A2 closes, and the brake is applied. The delayed operation and the manner in which it is operated is an important feature of the present invention. It has been found that without delayed brake application after a dispensing and cutting operation that the compressive forces previously built up in the dough cause a subsequent "oozing" or "bleeding" of the dough through the die apertures 15A. It is thus desirable in accordance with features of the present invention to relieve this build-up pressure on compressive forces by allowing the ram to move upwardly under the influence of the forces previously developed in the dough during its extrusion. Indeed these compressive forces in the dough cause the ram to retract or retreat to a point where frictionally held lever 89 (FIG. 8) causes the bounce-back switch 88 to open whereupon the motor brake coil 50B is deenergized as previously explained to then lock the ram in position.

To effect another dispensing operation the dispense of extrude button on the front panel must again be operated. After a number of such extrusions corresponding to depletion of the container 10, the ram or rack actuating member 87 causes the lower switch 86 to be actuated as well as switch 86B. Closure of switch 86B results in the warning or indicating lamp 104 on the front panel (FIG. 1) to be energized thereby indicating that all of the potato dough has been dispensed. Also opening of the switch 86 at this time prevents another extrusion cycle even though the extrusion switches 120 and 121 were closed by operation of the dispense or extrude button 100 on the front panel (FIG. 1).

The next sequence of operation thus involves raising the ram or rack 47 and this is occasioned by operating the retract button 103 on the front panel 98 (FIG. 1). Operation of that button results in operation of the retract switches 103A and 103B. When switch 103B is momentarily closed the cutter motor 43 is subsequently caused to go through one cycle of operation. As long as the retract switch 103B is maintained in its closed position, the cut-off motor 43 will keep cycling without any harm. However, it is not necessary that the retract button be continuously pressed for the ram to be retracted to its uppermost position. Only a momentary operation of the retract button is required to move the ram from its most downward position to its most upward position. Thus, when the retract switch 103A is closed, the relay winding CR1 is energized through a circuit which includes lead 115, relay switch CR2A2; winding CR1; switch 85; switch 103A and switch CR3C. This causes operation of the relay switches CR1A1; CR1A2; CR1B; CR1C; and CR1D. Closure of the relay switch CR1B provides a sealing circuit around the retract switch 103A which may then be allowed to open. Closure of switches CR1A1, CR1D and CR1C results in energization of the motor 50 to cause the ram or rack 47 to move upwardly. The other relay switch CR1A2 opens to provide electrical innerlock to prevent inadvertent initiation of an extrusion cycle. When the ram or rack 47 assumes its highest position wherein the actuating member causes the switch 85 to be operated, the switch 85 opens to thereby deenergize the relay coil CR1 and thereby interrupt the drive to the motor 50.

As indicated previously, the bounce-back switch 88 is involved in preventing bleeding of the dough after a dispensing operation. The elastic forces developed in the dough during the dispensing operation are allowed to be relieved prior to application of the motor brake. This feature is considered desirable because otherwise the part which is bled out may dry out and thus would not necessarily be of the same texture as that which is subsequently dispensed.

It is noted that when the dough container is most full these elastic forces developed during a dispensing operation are greatest and become progressively less during each successive dispensing operation. For this reason, it is desirable to provide some compensation for this change in force developed in the dough between, on the one hand, the full container condition and the nearly empty container condition. It is desired to eliminate this variation which causes a variation in length of the extrusion. However, if adjustments were made such that there is uniform extrusion lengths during successive dispensing operations there would be undesirable bleeding when the container is full.

In analyzing the forces and extrusion lengths, it is noted that elastic forces are greater, the fuller is the pot with dough.

Also, if the ram brake were applied immediately after a cutting operation the dough would extrude and such unwanted extrusion would deteriorate in appearance because of exposure to the air and be an addition to a subsequent extrusion. One important function of the brake which is applied only after some pressure has been relieved is to retain some pressure so that unnecessary ram travel during the next extruding cycle is avoided.

Thereafter as soon as the motor is energized the dough must be compressed before there is an extrusion and the amount of compression required, i.e., ram movement to produce this initial compression is greater the fuller the pot. Because the ram stroke length established by resistance 140 (disregarding the resistance 200 and assuming it to be shortcircuited for purposes of the present explanation) is constant this means that the extrusion is shorter the fuller the pot and such extrusion thus becomes longer the emptier the pot. It is desirable to maintain a constant extrusion length from a full pot to a near empty pot condition and this is accomplished by effectively changing the magnitude of resistance 140 in accordance with the amount of potato dough in the pot or container, i.e., in accordance with the position of ram 47 and its connected plunger 48. This is accomplished by mechanically interconnecting the tap of the series connected resistance 200 with the rack 47 as indicated by the dotted line 201. Initially the resistance 140 and 200 are adjusted such that there is no bleeding when the container is full and this thus establishes a predetermined length of extrusion. In general, this resistance 200 is changed as the container is emptied such that the extrusion time becomes shorter after each successive dispensing operation. Resistance 200 is thus maximum when the container is full and is of smallest value when the container is empty.

The foregoing discussion, in general, presupposes a linear relationship between on the one hand extrusion length and the time during which the ram moves forwardly. In practice, it has been found that this relationship is not linear because of the nature of the potato dough. Accordingly, instead of there being a linear relationship between ram movement or position and value of resistance 200, the magnitude of resistance 200 is caused to change in a nonlinear fashion using, for example, the arrangement shown in FIG. 21 wherein the tap 200A on resistance 200 is attached to one end of a cord 300, the other end of cord 300 being suitably secured to the outer periphery of a cam 302 which is driven by friction roller 306 interposed between rack 47 and the cam spindle 308. Thus as the ram 47 descends, the effective radius of the cam 302 changes between a low value R1 to a high value R2 causing the tap 200A to move nonlinearly with respect to movement of plunger 47. The resistance 200 in this instance may be of the so-called linear type, i.e. without so-called taper. In some instances the above described motion transfer mechanism may be discarded and the resistance 200 be of such nonlinearity or taper to accomplish the same general result. Because of the nature of the dough, the effective value of resistance 200 which is in series with resistance 140 should be decreased more than proportionately with each dispensing operation considering the fact that the length of extruded dough, because of the resilient nature of the dough, has a tendency to become more than proportionately longer the fuller the container.

It will be appreciated that when the photocell arrangement shown in FIG. 22 is used a braking system need not be incorporated to assure a constant length of extrusion in successive extrusion operations because that dough which extrudes after a previous operation is the leading edge of the next successive full length extrusion sensed by the photocell.

Another manner of controlling the length of extrusion involves the use of an optical system involving a light source L and a photocell PC in FIG. 22 which are positioned so that the leading edge of an extrusion interrupts the light beam to the photocell and causes a control circuit C to be energized to interrupt further downward movement of the plunger 47. This control circuit in general have the same function of timing unit TDU in FIG. 20 and produce operation of the related timing switches 1TDR1 and 1TDR2 so as to produce the functions and results described above in connection with FIG. 20. Thus in FIG. 22 when the light beam from lamp L to photocell PC in interrupted the switch 1TDR1 is closed and the switch 1TDR2 is opened and when the leading edge of the extruded dough interrupts the light beam switch 1TDR1 opens and switch 1TDR2 closes in the system otherwise described in connection with FIG. 20 wherein the extrusion is then cut and allowed to gravitate out of the light beam path in which case the switches 1TDR1 and 1TDR2 again close and open respectively. This modified arrangement thus does not require the time delay unit TDU when its switches are replaced by like switches 1TDR1 and 1TDR2 operated as described in conjunction with FIG. 22.

It will be appreciated that when the potato dough container is near empty there may be insufficient bounceback to operate the bounce-back switch 88 in which case the brake remains unapplied. Because there is insufficient bounce-back there is insufficient stored elastic forces in the dough itself and thus little or no bleeding of the dough occurs.

The circuit of FIG. 20 is modified to incorporate a pressure sensitive switch PS in series with the switch 1TDR1 and the time delay unit TDU. The operation is otherwise as described in connection with FIG. 20 except that in this modification that time established for actual extrusion established by the time delay unit TDU does not commence until a predetermined condition, i.e., pressure exists in the dough container 10 as established by the pressure sensitive switch PS in FIGS. 23 and 24. This switch PS is closed at the same pressure regardless of the volume of potato dough in the container and thus extrusion always begins under the same pressure condition regardless of the position of the piston 48; and since the duration of piston movement is always the same as established by the time delay unit TDU and its associated resistances it should be clear that successive extrusion operations result in the same lengths of extrusion.

A suitable pressure sensitive switch for this purpose is illustrated in FIG. 24 wherein a Bellville type circular spring washer 400 is interposed between the pressure plate 48 and the rack 47 which now moves relative to the pressure plate 48. The rack 47 at its lower end is provided with a bore 401 which intersects a transversely extending bore 402. A pin 404 is attached to the pressure plate 48 and is slidably mounted in the bore 401 and carries a laterally extending switch actuating member 405, such member 405 extending through the enlarged opening 402 for engaging and actuating the movable actuating element 407 of switch PS which itself is carried on the rack 47 by bracket 409.

Thus when a certain force or pressure is developed on the piston 48 as a result of compression of dough D in container 10, the spring 400 is compressed and consequently the actuating member 405 moves upwardly relative to the rack 47 to cause operation of the switch PS.

Using the arrangement of FIGS. 23 and 24, a braking arrnagement for the ram as well as means for delaying operation of such braking arrangement may be omitted if desired in accordance with other aspects of the present invention in which case the rack may, after a dispensing operation, recede upwardly varying distances for now the actual dispensing or extrusion occurs only when a predetermined pressure is developed during the downward stroke of the rack 47.

It is desired that relative small force be required to produce an extrusion and for that purpose the extrusion opening may be as illustrated in FIGS. 13 and 25 wherein the generally conical opening of diameter D and depth d has a taper defined by the angle C which is measured with respect to a horizontal line. The lower opening of generally square cross-section has a length designated by the letter —a—. As seen in FIG. 26, the four walls may each be concave so that ultimately the dough after extrusion, when free of pressure, has a more generally square cross-section.

The smaller the dimension —a— becomes the lesser the pressure necessary for extrusion but if the dimension -a- is very nearly zero then the quality of the extrusion is bad and becomes round even though the extrusion opening has the four concave walls illustrated in FIG. 26. The dimension —a— should not be greater than one quarter inch and should not be less than one sixteenth inch. Also closest spacing E between the conical openings as shown in FIG. 27 should be one thirty seconds of an inch or less for the same purpose, i.e., for lower pressure extrusion requirements.

In order to take advantage of a wider range of choices of commercially available components, alternate means for relieving accumulated or residual pressure in the dough at the end of each extrusion cycle to prevent bleeding may be provided. For example, worn gear reductors or certain types of screw jacks, would tend to resist back driving, in which case it is preferred that some positive means be incorporated to effect such back driving. Such means may involve, for example, the use of a reversing switch for reversing the direction of rotation of the driving motor at the end of an extruding cycle. Such reversing switch remains energized for as long as the pressure in the dough remains above a certain level. This is illustrated schematically in FIG. 28 where the motor 500 for driving the ram means 502 (corresponding to the rack and pinion in the previous figures) has means 504 for reversing its direction of rotation, such means 504 being effective to reverse the direction of movement of the ram means 502 when two conditions prevail, i.e., at the end of an extrusion cycle when the switch means 506 is operated and when the pressure of the dough initially compressed by forward movement of the ram means sensed by the pressure sensitive switch 508 remains closed. The reversing means 504 then remains operative to reverse the direction of rotation of motor 500 until the dough pressure sensed by switch 508 falls below a predetermined level. Instead of using a pressure sensitive switch for this purpose an auxilary timer 510 may be used instead as illustrated in FIG. 29 in which case such timer 510 is energized at the end of an extrusion cycle to cause the motor reversing means 504 to be actuated and such means 504 remains actuated until the timer 510 times itself out, i.e., the motor 500 is reversed only for a predetermined time interval.

In some cases it may be desirable to automatically return the plunger assembly to its initial uppermost position after the container is emptied and this may be accomplished by using a switch 86C in FIG. 30, such switch 86C being operated when its related switched 86 and 86B in FIG. 20 is operated and serving as illustrated in FIG. 30 to energize coil CR1 through switch CR2A2.

While the particular embodiment of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of this invention.

We claim:

1. In an extruding machine of the character described; a supporting structure including a material storage unit for material to be dispensed; a plunger assembly movably mounted within said material storage unit for movement in a dispensing direction and also in a retract direction opposite to said dispensing direction under the influence of compressive forces developed in the material during prior movement in said dispensing direction; brake means normally maintaining said assembly in stationary condition; means for disabling said brake means; and power operated means for moving said plunger assembly and means for enabling said brake means after said assembly moves a predetermined distance in said retract direction sufficient to allow said compressive forces to be reduced to substantially zero.

2. In an extruding machine of the character described; a supporting structure; a plunger assembly movably mounted on said structure; a dough container into which said plunger extends for compressing dough and extruding dough from said container; time controlled means for establishing a time duration during which dough is extruded during movement of said plunger assembly; and pressure responsive means responsive to pressure build-up in said container produced by movement of said plunger assembly for initiating operation of the last mentioned means.

3. A machine as set forth in claim 2 including means for retracting said plunger assembly a distance sufficient to allow substantial reduction of compressive forces in the dough in said container.

4. In an extruding machine of the character described; a supporting structure; a plunger assembly movably mounted on said structure in an extruding direction and in an opposite retracting direction; a container for compressible dough from which said dough is extruded by said plunger assembly into the atmosphere; means for moving said plunger assembly; and pressure responsive means actuated in accordance with compressive forces developed in said dough by said plunger assembly for initiating operation of the last mentioned means to thereby produce movement of said plunger assembly.

5. A machine as set forth in claim 4 in which said pressure responsive means initiates operation of said means for moving said plunger assembly such as to produce movement of said plunger assembly in said extruding direction.

6. A machine as set forth in claim 4 in which said pressure responsive initiates operation of said means for moving said plunger assembly such as to produce movement of said plunger assembly in said retracting direction.

7. A combined dough mixing and dispensing device including a generally cylindrical hollow container having an opening at each of its ends; said container having an internal flange portion near one of its ends and an external flange portion at the other of its ends; a piston assembly in said container; said piston assembly comprising a disc-like element having a diameter substantially equal to but less than the internal diameter of said container; and an elastic element carried on said disc-like element and contacting the inner wall of said container to provide a seal both during mixing of the dough and dispensing of the dough, said disc-like element having a central enlarged portion and an annular groove portion; and said elastic ring-shaped element being releasably secured in said groove portion, said external flange being adapted to rest on a flat surface during a dough mixing operation and said internal flange portion being adapted to lie within a die extrusion plate during dispensing of the dough.

8. In a machine of the character described; a supporting structure; an elongated actuating member movably mounted on said supporting structure and protruding therefrom; a bellows into which one end of said actuating element protrudes; means releasably secured to said one end of said actuating element and closing one end of said bellows; and means releasably securing the other end of said bellows to said supporting structure and a pressure plate mounted on said actuating element and contacting said one end of said bellows.

9. In an arrangement of the character described a supporting structure; an elongated actuating element extending from said structure; a bellows encircling an end of said actuating element; means releasably securing one end of said bellows in sealing engagement with said supporting structure and means releasably sealingly connecting the other end of said bellows to said actuating element and a pressure plate mounted on said actuating element and contacting said other end of said bellows.

10. In an arrangment of the character described an extrusion dieplate; a cutter frame mounted underneath said dieplate; a supporting structure in which said cutter frame is movably mounted; and a plurality of concentrically mounted elements on said supporting frame and contacting said cutter frame for adjustment of said cutter frame with respect to said extrusion plate.

11. In an extruding machine of the character described; a supporting structure including a material storage unit from which compressible material is to be dispensed; a plunger assembly movably mounted within said storage unit in a dispensing direction and also in a retract direction opposite to said dispensing direction; power operated means for moving said plunger assembly in said dispensing direction to accomplish an extrusion; said plunger assembly being moved after said extrusion in said retract direction a distance sufficient to allow release of substantially all compression forces in said material; means normally maintaining said plunger assembly in a stationary condition; and means controlling movement of said plunger assembly in said retract direction.

12. In an arrangement of the character described a ram member; a pair of spaced stop members carried on said ram member; a switch actuating member between said stop members; and a frictional connection between said ram member and said switch actuating member.

13. In an arrangement as set forth in claim 12 including a braking device for said ram member; a switch operated by said switch actuating element; and said switch controlling said brake.

14. In an extruding machine of the character described; a supporting structure; a plunger assembly movably mounted on said structure; brake means normally maintaining said assembly in stationary condition; means for disabling said brake means; and power operated means for moving said plunger assembly in a forward extruding direction, said plunger assembly including a rack member; said power operated means includes a motor with a gear on the output shaft of the motor meshing with said rack; and said brake means includes a braking device for maintaining said motor shaft stationary; means for disabling said power operated means; and means automatically effective after said plunger moves a predetermined distance in the backward retracting direction for enabling said brake means to thereby prevent further backward retracting movement.

15. In an extruding machine of the character described; a supporting structure; a plunger assembly movably mounted on said structure; brake means normally maintaining said assembly in stationary condition; means for disabling said brake means; and power operated means for moving said plunger assembly in a forward extruding direction; means for energizing and deenergizing said power operated means; and means for assuring operation of said brake means only after said power operated means is deenergizied, the last-mentioned means (being sensitive to a condition of said plunger assembly) incorporating means actuated only after said plunger assembly is returned a predetermined distance in the backward retract direction.

16. In an extruding machine of the character described; a supporting structure; a plunger assembly movably mounted on said structure; brake means normally maintaining said assembly in stationary condition; means for disabling said brake means; and power operated means for moving said plunger assembly; a container for dough; an extruding die associated with said container through which said dough may be extruded; said plunger assembly cooperating with said container to extrude dough through said die; means for energizing and deenergizing said power operated means; and means effective after said power operated means is deenergizied and responsive to pressures developed in said dough for rendering said means for disabling said brake means ineffective and to thereby render said brake means effective.

17. A machine as set forth in claim 16 in which the last-mentioned means is also responsive to the amount of dough in said container after an extruding operation.

18. In an extruding machine of the character described, a supporting structure; a plunger assembly movably mounted on said structure; brake means normally maintaining said assembly in stationary condition; means for disabling said brake means; and power operated means for moving said plunger assembly; said plunger assembly including a ram member; said power operated means including a motor-driven shaft with means for driving said ram; a pair of spaced stop members on said ram member; a lever frictionally mounted on said motor shaft and positioned between said stop members, a switch operated by said lever, and said switch controlling said brake means.

19. A machine as set forth in claim 18 in which said supporting structure mounts a pair of spaced switches operated by a switch actuating member carried on said ram member at the extreme ends of movement of said ram member for controlling said motor.

20. A machine as set forth in claim 19 including dough cutting means operated prior to application of said brake means.

21. In an arrangement of the character described a supporting structure; an elongated actuating element extending from said structure; a bellows encircling said end of said actuating element; means releasably securing one end of said bellows in sealing engagement with said supporting structure, and means releasably sealingly connecting the other end of said bellows to said actuating element, said first means including a plate-like element secured to said supporting structure by screws extending through bayonet type slots in said plate-like element.

22. In an arrangement of the character described a supporting structure; an elongated actuating element extending from said structure; a bellows encircling said end of said actuating element; means releasably securing one end of said bellows in sealing engagement with said supporting structure, and means releasably sealingly connecting the other end of said bellows to said actuating element, the second mentioned means including a pressure plate; a threaded element having one of its ends secured in said pressure plate and having the other one of its ends threaded in the end of said actuating element; and a washer between said end of said actuating element and said pressure plate with said washer and pressure plate serving to sandwich a portion of said bellows therebetween.

23. In an extruding machine of the character described a supporting including a container for compressive material; a plunger assembly movably mounted on said structure and extending into said container to compress said material and for extruding said material; power operated means for moving said plunger assembly in one direction to compress said material; timing means controlling the duration of operation of said power operated means such that the length of material extruded is determined by the time during which said timing means is effective; and pressure sensitive means responsive to the pressure developed by said plunger in said material for rendering said timing means effective to initiate operation of said power operated means.

24. An extruding machine as set forth in claim 23 including means for rendering said power operated means ineffective after a time interval established by said timing means; and means effective after said timing means has timed itself out and established the length of extruded material for moving said plunger assembly in a reverse direction a distance sufficient to relieve compressive stress developed in the material during the preceding extruding operation.

25. In an extruding machine of the character described, a supporting structure including a material storage unit from which compressible material is to be dispensed; a normally stationary plunger assembly including a driving rod assembly having a driving rod movable within said storage unit in an extruding direction and also in a retracting direction; power operated means for driving said plunger assembly in said extruding direction a pre-selected distance to an extended position and, upon completion of said movement in said extruding direction, means operative to control said plunder assembly to move a distance in the retract direction to a retract position sufficient to release pressure build-up in said storage unit with the extent of movement from said extended position to said retract position being dependent upon said pressure build-up which is being released.

26. In an extruding machine of the character described, a supporting structure including a material storage unit from which compressible material is to be dispensed; a normally stationary plunger assembly including a driving rod assembly having a driving rod movable within said storage unit in an extruding direction to an extended position and also in a retracting direction to a retract position; power operated means for driving said plunger assembly in said extruding direction a preselected distance to said extended position and, upon completion of said movement in said extruding direction, means operative to control (upward) movement of said plunger assembly to (a predetermined retracted) said retract position sufficient to release pressure buildup in said storage unit with the extent of movement from said extended position to said retract position being dependent upon said pressure build-up which is being released.

27. In an extruding machine of the character described; a supporting structure; a plunger assembly movably mounted on said structure; a dough container into which said plunger extends for compressing dough and extruding dough from said container; means for establishing a time duration during which dough is extruded; and pressure responsive means responsive to pressure in said container for controlling the last-mentioned means; means for retracting said plunger assembly a distance sufficient to allow substantial reduction of compressive forces in the dough in said container; and means responsive to said compressive forces and controlling said retracting means.

28. In an extruding machine of the character described; a supporting structure; a plunger assembly movably mounted on said structure; a dough container into which said plunger extends for compressing dough and extruding dough from said container; means for establishing a time duration during which dough is extruded; and pressure responsive means responsive to pressure in said container for controlling the last-mentioned means; means for retracting said plunger assembly a distance sufficient to allow substantial reduction of compressive forces in the dough in said container; and means responsive to time and controlling said retracting means.

* * * * *